United States Patent
Kaneyoshi

(10) Patent No.: US 7,390,436 B2
(45) Date of Patent: *Jun. 24, 2008

(54) ZIRCONIUM OR HAFNIUM-CONTAINING OXIDES

(75) Inventor: Masami Kaneyoshi, Takefu (JP)

(73) Assignee: Shin-Etsu Chemical Co., Ltd, Tokyo (JP)

( * ) Notice: Subject to any disclaimer, the term of this patent is extended or adjusted under 35 U.S.C. 154(b) by 209 days.

This patent is subject to a terminal disclaimer.

(21) Appl. No.: 11/099,586

(22) Filed: Apr. 6, 2005

(65) Prior Publication Data

US 2005/0224759 A1    Oct. 13, 2005

(30) Foreign Application Priority Data

Apr. 8, 2004    (JP) .............................. 2004-113704

(51) Int. Cl.
*C09K 11/81*    (2006.01)
(52) U.S. Cl. ............................... 252/301.4 P
(58) Field of Classification Search .......... 252/301.4 R, 252/301.4 F, 301.4 P
See application file for complete search history.

(56) References Cited

U.S. PATENT DOCUMENTS 3,941,715 A    3/1976    Shidlovsky
4,716,336 A    12/1987   Schutten et al.
5,003,181 A *  3/1991    Morlotti ................. 250/484.4
5,156,764 A *  10/1992   Kaneda et al. ......... 252/301.4 P
5,422,040 A *  6/1995    Maofu et al. .......... 252/301.4 P
6,099,754 A *  8/2000    Yocom ................. 252/301.4 F
2003/0124383 A1* 7/2003  Akiyama et al. ............ 428/690

FOREIGN PATENT DOCUMENTS

EP    0 206 393 A1    12/1986
JP    48-34675        10/1973
JP    8-73845         3/1996
JP    8-283713        10/1996
JP    11-349939       12/1999

OTHER PUBLICATIONS

Mares et al, "Radiation induced color centered and damage in YAlO3:Cr and YAlO3:Ce,Zr scintillators", Rad. Eff & defects in solids, 202, vol. 157, pp. 677-681.*

Sulc et al, "Kinetics of induced absorption phenomena in YAIo3:Ce scintillator", Rad. Eff & defects in solids, 202, vol. 157, pp. 963-968.*

Patent Abstracts of Japan, vol. 2000, No. 11, Jan. 3, 2001 & JP 2000 212557 A, Aug 2, 2000.

* cited by examiner

*Primary Examiner*—C. Melissa Koslow
(74) *Attorney, Agent, or Firm*—Westerman, Hattori, Daniels & Adrian, LLP.

(57) ABSTRACT

Oxo-acid salts, double oxides or complex oxides contain 0.001-10 atom % of Zr or Hf. They emit near-ultraviolet radiation when excited with vacuum-ultraviolet radiation.

1 Claim, 1 Drawing Sheet

ZIRCONIUM OR HAFNIUM-CONTAINING OXIDES

CROSS-REFERENCE TO RELATED APPLICATION

This non-provisional application claims priority under 35 U.S.C. §119(a) on patent application Ser. No. 2004-113704 filed in Japan on Apr. 8, 2004, the entire contents of which are hereby incorporated by reference.

TECHNICAL FIELD

This invention relates to Zr or Hf-containing oxides (oxo-acid salts, double oxides or complex oxides) possessing characteristic luminescence.

BACKGROUND ART

Zirconium (Zr) and hafnium (Hf) are often contained in phosphors, for example, used in the form of $CaZrO_3$ as host crystals for adding light-emitting elements (see JP-A 8-283713), added to aluminate-based host crystals along with Eu for prolonging the afterglow of emission (see JP-A 8-73845), and added to rare earth oxychlorides or oxybromides along with Ce for improving the conversion efficiency of radiation-excited phosphors (see JP-A 11-349939).

However, few studies have been made on the luminescence and other properties of systems in which only zirconium or hafnium is added as a dopant to clear crystals which do not exhibit active optical characteristics in themselves.

SUMMARY OF THE INVENTION

An object of the invention is to provide Zr or Hf-containing oxides (oxo-acid salts, double oxides or complex oxides) which emit near-ultraviolet radiation having a peak wavelength of about 270 to 340 nm when excited with vacuum-ultraviolet radiation.

The inventors have found that oxo-acid salts, double oxides or complex oxides, especially oxo-acid salts such as phosphates, silicates, aluminates or borates of alkaline earth metals or rare earth elements, or combinations of these oxo-acid salts (double oxides or complex oxides), containing zirconium (Zr) or hafnium (Hf) in an amount of 0.001 atom % to 10 atom % based on the entire atoms are useful phosphors because they emit near-ultraviolet radiation having a peak wavelength of about 270 to 340 nm when excited with vacuum-ultraviolet radiation.

The invention provides an oxide which is an oxo-acid salt, double oxide or complex oxide containing zirconium or hafnium in an amount of 0.001 atom % to 10 atom % based on the entire atoms. Preferably, the oxo-acid salt, double oxide or complex oxide contains oxygen, at least one element selected from alkaline earth metal elements and rare earth elements, and at least one element selected from P, Al, Si and B. Typically, the oxo-acid salt, double oxide or complex oxide is a silicate containing Ca or Mg, a complex oxide containing Ca, Al, Si and O, a complex oxide containing Ca, a rare earth element, Al and O, a phosphate containing a rare earth element, or a silicate containing a rare earth element. The oxide is typically used as a phosphor. The oxide emits radiation in the ultraviolet region of 270 to 340 nm when excited with ultraviolet radiation of 130 to 220 nm.

The oxo-acid salts, double oxides or complex oxides having zirconium or hafnium added thereto of the present invention are capable of converting radiation in the vacuum-UV region to radiation in the near-UV region so that they can be utilized as phosphors in near-UV emission lamps. They will also find use in plasma displays using vacuum-UV radiation as the excitation source, and fluorescent lamps using rare gases instead of mercury, if combined with phosphors capable of converting near-UV radiation to visible light.

DESCRIPTION OF THE PREFERRED EMBODIMENTS

Figure 1:
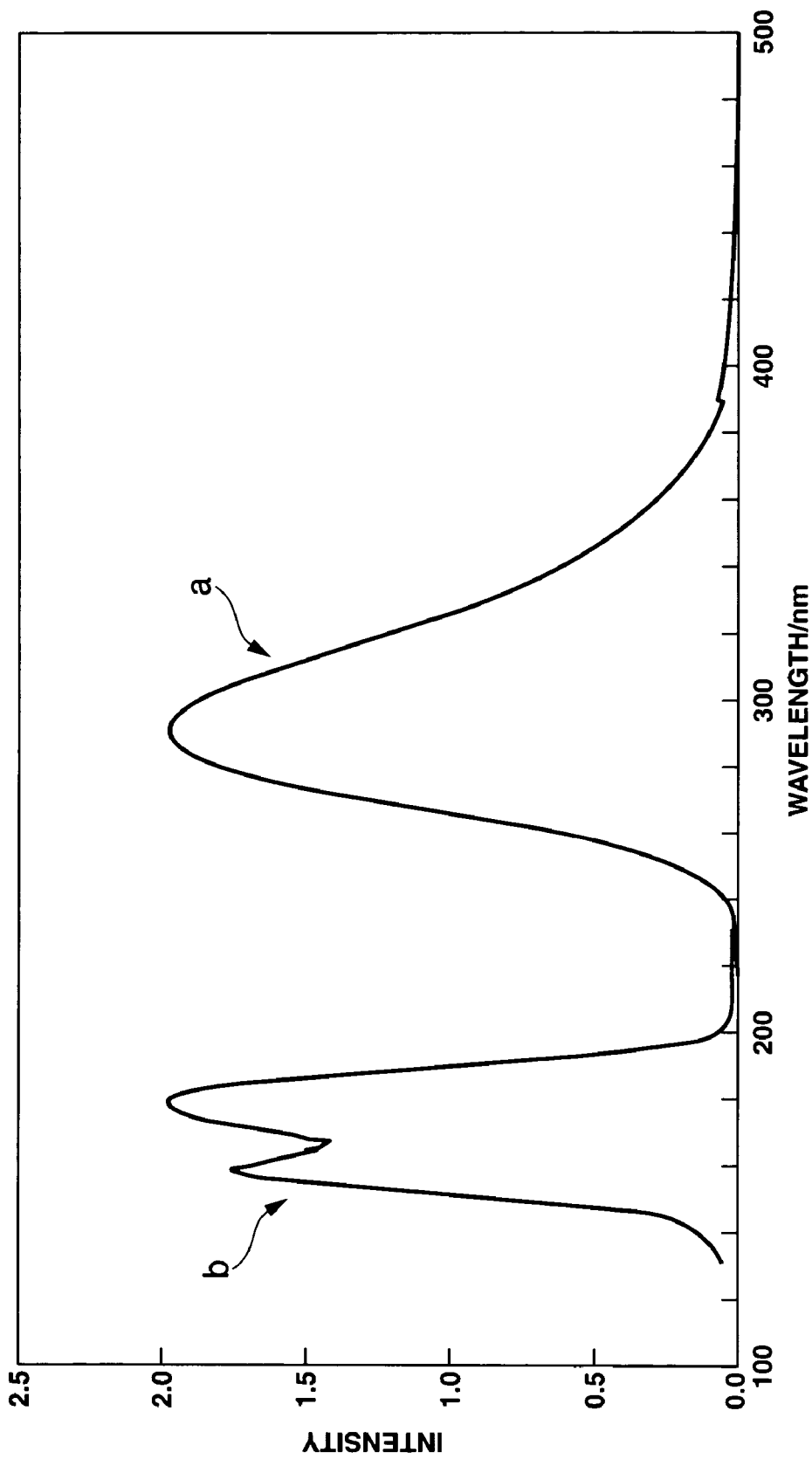
FIG. 1 is a chart illustrating the spectrum (b) of exciting radiation having a peak at 177.4 nm and the spectrum (a) of emission having a peak at 291.2 nm from Sample No. 1 in Example 1.

The oxide of the invention is an oxo-acid salt, double oxide or complex oxide containing zirconium or hafnium in an amount of 0.001 atom % to 10 atom % based on the entire atoms.

The host crystals used for the oxide include oxo-acid salts such as phosphates, silicates, aluminates or borates of alkaline earth metals, i.e., Be, Mg, Ca, Sr and Ba belonging to Group IIA in the Periodic Table or rare earth elements, i.e., Sc and Y belonging to Group IIIA in the Periodic Table and lanthanoids of atomic number 57 to 71, and combinations of these oxo-acid salts (referred to as double oxides or complex oxides).

The host crystals which can be used in the oxides of the invention include oxo-acid salts, double oxides and complex oxides which contain oxygen, at least one element selected from alkaline earth metal elements and rare earth elements, and at least one element selected from P, Al, Si and B. The preferred host crystals include complex oxides (or silicates) containing Ca and/or Mg, Si and O, complex oxides (or aluminosilicates) containing Ca, Al, Si and O, complex oxides (or aluminates) containing Ca, a rare earth element, Al and O, phosphates of rare earth elements, and silicates of rare earth elements because a certain quantity of zirconium forms a solid solution uniformly with these oxides.

The composition of these host crystals is typified by $CaMgSi_2O_6$ for the Ca and/or Mg-containing silicates; $Ca_2Al_2SiO_7$ for the aluminosilicates; $CaYAl_3O_7$ or $YAlO_3$ for the aluminates; $YPO_4$ or $LaPO_4$ for the rare earth phosphates; and $Y_2SiO_5$ for the rare earth silicates.

According to the invention, Zr or Hf is added to the above-mentioned host crystals in an amount of 0.001 atom % to 10 atom %, preferably 0.01 atom % to 5 atom %, based on the entire atoms. With less than 0.001 atom % of Zr or Hf, no substantial luminescence is observable. If the amount of addition or substitution is increased beyond 10 atom %, such an excess does not effectively substitute or form a solid solution in the crystal, but inconveniently forms different chemical species. The preferred additive element is zirconium because of richer resources and lower costs.

Now the method of preparing oxo-acid salts, double oxides or complex oxides is described. Although the method is not particularly limited, it generally starts with raw materials including oxides, carbonates and oxalates in powder form containing the metal elements of which the oxo-acid salts, double oxides or complex oxides are comprised, and optionally, silicon oxide, phosphorus-containing materials such as phosphoric acid and ammonium phosphate, and boron-containing materials such as boric acid, boron oxide and ammonium borate. A method commonly used in the art involves the steps of mixing such powdery raw materials and optional materials, and heating the mix at a temperature of 800 to 1,800° C. for a period of 30 minutes to 24 hours to induce reaction, and it will find a wider range of application. This method is advantageously used in the practice of the present invention. With respect to the metal elements and silicon, it is preferred to weigh and mix their raw materials in accordance with the target composition. With respect to the phosphate and borate materials, it is sometimes effective to mix them in amounts which are larger than the target composition by one equivalent to about two equivalents. A flux such as alkali metal fluorides may be added to accelerate the reaction.

Another method is by mixing pre-formed oxo-acid salts or complex oxides in powder form with Zr or Hf-containing oxides, carbonates or oxalates in powder form, and other components in powder form such as phosphate or borate materials in such amounts as to give the desired composition, and heating the mix in the above-defined temperature range for the above-defined period for inducing reaction. This method can also be used in the practice of the present invention.

An alternate method starts with water-soluble compounds containing some or all of the elements of which the oxo-acid salts, double oxides or complex oxides of the invention are comprised. The water-soluble compounds are reacted in solution form whereby the reaction product is precipitated and dried or fired to remove water. The product is the desired oxo-acid salt, double oxide or complex oxide or an intermediate thereto.

When two or more powders are mixed, the mixing technique is not particularly limited. A mortar, fluidized mixer or inclined rotary drum mixer may be used.

The atmosphere in which the materials are heated for reaction may be selected from air, inert atmospheres and reducing atmospheres.

EXAMPLE

Synthesis Examples and Examples of the invention are given below by way of illustration and not by way of limitation.

Synthesis Example 1

Yttrium phosphate ($YPO_4$) was previously synthesized by reacting aqueous phosphoric acid with an aqueous solution of yttrium chloride and firing the resulting precipitate. In an automated mortar, 10.76 g of $YPO_4$, 0.185 g of $ZrO_2$ (TZ-0 by Tosoh Corp.), and 0.198 g of diammonium hydrogenphosphate (($NH_4)_2HPO_4$, guaranteed reagent) were mixed. The mix was placed in an alumina crucible and heated to 1,200° C. in an electric furnace through which nitrogen gas flowed at 0.7 $dm^3$/min (calculated in the standard state). The mix was held at the temperature for 4 hours, and then cooled in the nitrogen stream. The fired product was disintegrated on a mortar into a powder, designated Sample No. 1.

Synthesis Example 2

Lanthanum phosphate ($LaPO_4$) was previously synthesized by reacting aqueous phosphoric acid with an aqueous solution A of lanthanum nitrate and firing the resulting precipitate. Using 22.22 g of $LaPO_4$, 0.308 g of $ZrO_2$, and 0.660 g of diammonium hydrogenphosphate (($NH_4)_2HPO_4$, guaranteed reagent), the procedure of Synthesis Example 1 was repeated to obtain a powder, designated Sample No. 2.

Synthesis Example 3

In an automated mortar, 4.00 g of calcium carbonate (99.99% $CaCO_3$ reagent, Wako Junyaku Co., Ltd.), 2.46 g of $ZrO_2$, and 4.81 g of silicon oxide $SiO_2$ (1-FX, Tatsumori Co., Ltd.) were mixed. The mix was placed in an alumina crucible and heated to 1,200° C. in air in an electric furnace. The mix was held at the temperature for 4 hours, and then cooled. The fired product was disintegrated on a mortar into a powder, designated Sample No. 3.

Synthesis Example 4

Using 5.00 g of $CaCO_3$, 1.61 g of magnesium oxide MgO (500A, Ube Materials Co., Ltd.), 6.01 g of $SiO_2$, and 0.616 g of $ZrO_2$, the procedure of Synthesis Example 3 was repeated to obtain a powder, designated Sample No. 4.

Synthesis Example 5

Using 7.41 g of $CaCO_3$, 4.08 g of aluminum oxide $Al_2O_3$ (Taimicron TM-DA, Taimei Chemical Co., Ltd.), 2.40 g of $SiO_2$, and 0.370 g of $ZrO_2$, the procedure of Synthesis Example 3 was repeated to obtain a powder, designated Sample No. 5.

Synthesis Example 6

Using 4.30 g of $CaCO_3$, 4.18 g of yttrium oxide $Y_2O_3$ (4N, Shin-Etsu Chemical Co., Ltd.), 6.12 g of $Al_2O_3$, and 0.370 g of $ZrO_2$, the procedure of Synthesis Example 3 was repeated to obtain a powder, designated Sample No. 6.

Examples 1 to 6

Measurement of Luminescence Spectrum

Using a vacuum-UV region absorption/luminescence spectrometer (Bunkoh Keiki Co., Ltd.), the luminescence spectra of Sample Nos. 1 to 6 when excited with vacuum-UV radiation were measured, with the results shown in Table 1. FIG. 1 illustrates the exciting spectrum (b) and the luminescence spectrum (a) of Sample No. 1 in Example 1.

TABLE 1

| | | | Zr or Hf substitution (at %) | Emission spectrum | | | | Exciting spectrum | | |
|---|---|---|---|---|---|---|---|---|---|---|
| | | Sample | | Peak wavelength (nm) | Peak height | Half bandwidth* (nm) | Exciting wavelength (nm) | Peak wavelength (nm) | Peak height | Photometric wavelength** (nm) |
| Example | 1 | #1 YPO$_4$:Zr | 0.42 | 289.4 | 1.98 | 61.5 | 177.4 | 177.4 | 1.98 | 291.2 |
| | 2 | #2 LaPO$_4$: Zr | 0.42 | 302.4 | 0.441 | 69.6 | 183.2 | 182.6 | 0.396 | 287.4 |
| | 3 | #3 Ca$_2$ZrSi$_4$O$_{12}$ | 5.3 | 318.8 | 0.269 | 70.3 | 182.4 | 182.4 | 0.265 | 322.8 |
| | 4 | #4 CaMgSi$_2$O$_6$:Zr | 1.0 | 319.6 | 0.583 | 68.1 | 185.6 | 185.6 | 0.587 | 325.0 |
| | 5 | #5 Ca$_2$Al$_2$SiO$_7$:Zr | 0.63 | 310.4 | 0.334 | 69.7 | 179.0 | 179.0 | 0.298 | 307.0 |
| | 6 | #6 CaYAl$_3$O$_7$:Zr | 0.63 | 286.0 | 0.108 | 66.5 | 173.4 | 173.4 | 0.104 | 290.0 |

*full width of a peak distribution measured at half the maximum emission intensity
**The wavelength of measuring the intensity of luminescence when the excitation wavelength is varied Japanese Patent Application No. 2004-113704 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A zirconium containing oxide which is a host crystal of LnPO$_4$:Zr, where Ln is Y or La and the amount of zirconium is 0.001 atom % to 10 atom % based on the entire atoms,
said zirconium-containing oxide emitting radiation in the ultraviolet region of 270 to 340 nm when excited with ultraviolet radiation of 130 to 220 nm.

* * * * *